Jan. 19, 1960 A. J. COLMERAUER 2,921,483
TRANSMISSION APPARATUS
Filed Nov. 9, 1956 2 Sheets-Sheet 1

INVENTOR.
ANDREW J. COLMERAUER
BY
ATTORNEYS

Jan. 19, 1960 A. J. COLMERAUER 2,921,483
TRANSMISSION APPARATUS
Filed Nov. 9, 1956 2 Sheets-Sheet 2

INVENTOR.
ANDREW J. COLMERAUER
BY
Fulwider Mattingly & Huntley
ATTORNEYS

United States Patent Office 2,921,483
Patented Jan. 19, 1960

2,921,483

TRANSMISSION APPARATUS

Andrew J. Colmerauer, Long Beach, Calif.

Application November 9, 1956, Serial No. 621,252

10 Claims. (Cl. 74—774)

The present invention relates generally to transmissions and particularly to a variable speed transmission apparatus.

An object of my invention is to provide a transmission in which torque is transmitted from a drive shaft to a driven shaft through a gear pump coupling. This coupling means is particularly adapted to providing a very great range of transmission ratios between drive and driven shafts whereby an efficient torque ratio can be established therebetween for accelerating loads imposed on the driven shaft.

Another object of the invention is to provide a transmission of this type in which the gear pumps are provided with means to relieve the very high fluid pressures generated at the meshing root areas of the gear teeth. This arrangement is advantageous in reducing wear on the gear bearings and also relieves the force with which the gear teeth run in the gear pump chamber. In this connection the invention includes the use of replaceable elements for lining the end walls of the gear pump chamber, these elements having the pressure relief means formed integrally therewith.

A further object of the invention is to provide a gear pump type of transmission having improved means to control the flow of liquid through the pumps. My improved construction is greatly simplified by virtue of the use of valve means which eliminates springs and bevel gears and many relatively movable parts. At the same time these valve means are pressure balanced for ease of operation.

United States Patent No. 2,727,607 issued to me on December 20, 1955, discloses a variable speed transmission that also uses gear pump coupling means. That patent discloses a transmission in which the drive is transmitted through the transmission housing and also a form in which the housing remains stationary while the driven member turns inside of it. The present invention is also capable of either of these arrangements but provides an improved transmission whose housing remains stationary.

A still further object of the invention is to provide a transmission that includes means changing the ratio between the drive shaft and gear pump coupling means. By means of this construction the transmission can be particularly adapted for specific applications by providing reduction or multiplication ratios as desired.

Further objects and advantages of my invention will be apparent from the following description of a presently preferred embodiment thereof and from the annexed drawings illustrating that embodiment in which.

Figure 1:
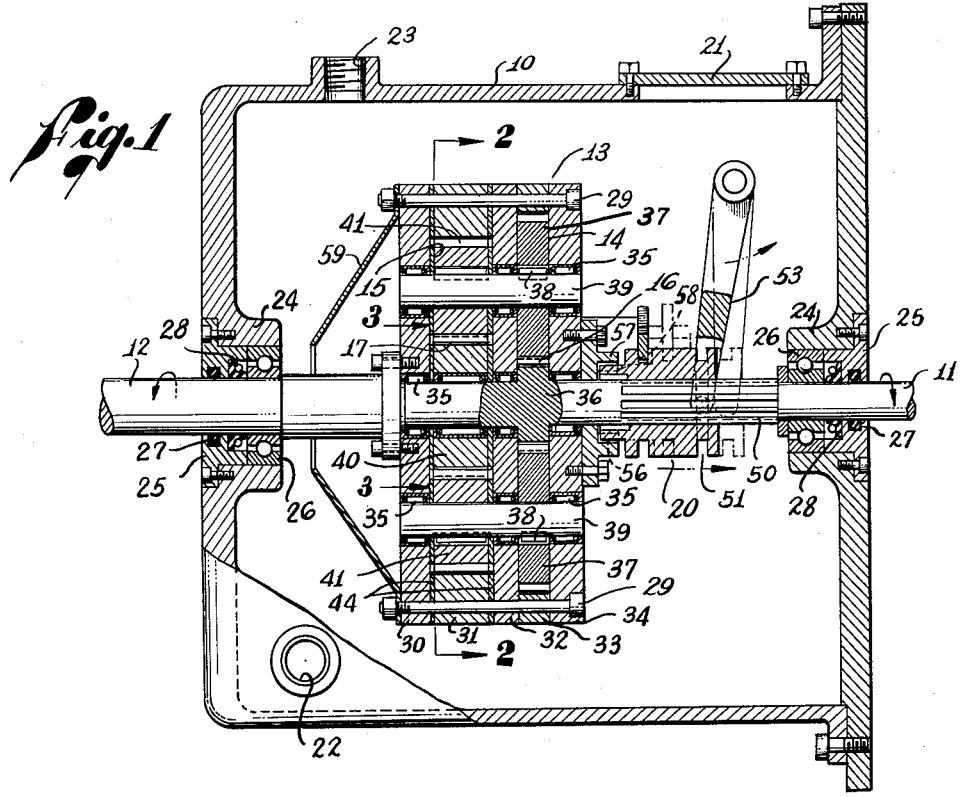
Figure 1 is a longitudinal sectional view of a variable speed transmission apparatus embodying my invention taken along a vertical plane through the axes of the drive and driven shafts.
Figure 2:
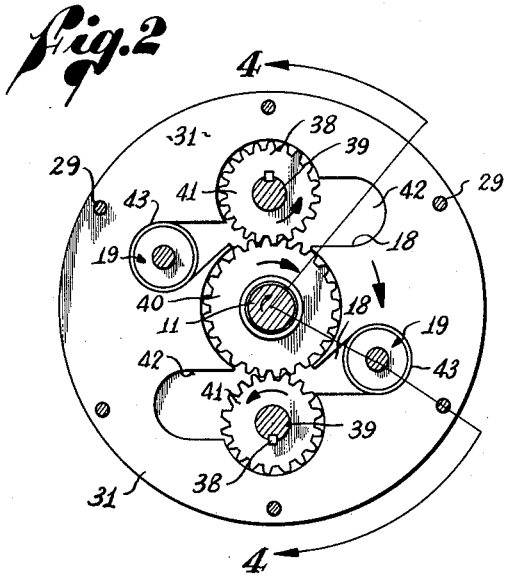
Figure 2 is a transverse sectional view taken on the line 2—2 of Figure 1 and showing the manner of mounting the gear pump coupling means.

Referring now to the drawings for the general arrangement of the invention and in particular to Figure 1 there will be seen a housing designated generally by the numeral 10 which is adapted to be rigidly mounted adjacent to a prime mover. Rotatably mounted through opposite end walls of housing 10 are a drive shaft 11 and a driven shaft 12. The shafts 11 and 12 are coaxially aligned and the inner end of the driven shaft 12 rigidly mounts a cylindrical casing generally designated by the numeral 13 that comprises a plurality of concentrically mounted plates which are centrally bored in order to rotatably receive therein the inner end of the drive shaft 11. These plates are also adapted to define in the casing 13 a drive gear chamber 14 and a separate pump gear chamber 15. Mounted in the chamber 14 is drive gear means 16 that is drivingly connected to pump gear means 17 contained in the chamber 15. Referring to Figure 2 it will be seen that the plate of the casing 13 in which the pump gear means is mounted is formed with a plurality of fluid passage means 18 therethrough whereby oil or other similar liquid contained in the housing 10 is communicated with pump gear means 17. The outlets of the fluid passage means 18 are controlled by valve means 19 which in turn are actuated by axial movement of a control sleeve 20 that is carried by drive shaft 11.

Specifically, the housing 10 is a fluid sealed enclosure which can be of either cylindroid or cubic configuration. Housing 10 is suitably provided with an access cover 21 by means of which the interior of the transmission can be examined and the oil supply replenished and with an inlet 22 and an outlet 23 which communicate with a reservoir and also with oil cooling means if desired.

To prevent the escape of oil from the interior of housing 10 around the shafts 11 and 12, both of these shafts are mounted in the manner shown in Figure 1. The opposite end walls of housing 10 are provided with integrally formed coaxially aligned hub portions 24. Removably mounted in each hub 24 is a bushing 25 and a roller bearing 26. Bushing 25 is adapted to support an O-ring seal 27 in sealing engagement with the shaft and also seats a packing ring 28 on the inside of the bushing.

The casing 13 is comprised of a plurality of circular plates which are held in an assembled relationship by means of bolts 29 or the like. As viewed in Figures 1 and 4 the plates are designated from left to right by the numerals 30, 31, 32, 33, and 34. The plates 32 and 34 are spaced apart by the plate 33 and define opposite end walls of the drive gear chamber 14. The plate 33 is formed with a series of diametrically disposed overlapping circular openings which are adapted to receive the drive gear means 16 therein. The plates 30 and 32 are separated by the plate 31 and define opposite end walls of the pump gear chamber 15. The plate 31 is shown in Figure 2 and it will be observed that it too is adapted to receive diametrically disposed gears therein in a close running fit in a manner similar to the mounting of the drive gear means 16 in the chamber 14. It will be observed that the plates 30, 32 and 34 are centrally bored to receive roller bearings 35 or the like by means of which the drive shaft 11 is rotatably received through the axis of casing 13.

3

As can best be seen in Figure 1, the drive gear means 16 comprises a drive gear 36, which can be formed integrally with drive shaft 11, and a pair of transfer gears 37. Both of the transfer gears 37 are keyed as at 38 to gear shafts 39 which extend longitudinally through casing 13. The gear shafts 39 are freely rotatably mounted in casing 13 by roller or ball bearings designated by the numeral 35.

The pump gear means 17 comprises a sun gear 40 and a pair of pump gears 41. The sun gear 40 is freely rotatably mounted on the inner end of drive shaft 11 by roller bearings 35 and driven by pump gears 41. The pump gears 41 are keyed to the aforementioned gear shafts 39 whereby they rotate in unison with the transfer gears 37.

As can best be understood by reference to Figures 1 and 2 the pump gear means 17 and drive gear means 16 are symmetrically disposed with respect to the axis of rotation of the apparatus. By this arrangement the requisite counterbalancing which is necessary at high speed is achieved. It will also be observed that the fluid passage means 18 are similarly symmetrically disposed with respect to the axis of rotation as are also the valve means 19 presently to be described.

Each of the fluid passage means 18 is provided with an inlet 42 and an outlet 43 (Figure 4) consisting of bores formed through the left end or rear plate 30 of the casing 13. When the device is in operation, the oil contained in housing 10 will enter casing 13 through inlets 42 to be driven by the pump into the outlets 43. As is shown in Figure 5 when valve means 19 are opened the fluid will pass out through outlets 43. When valve means 19 are closed as in Figure 4 the fluid entrained by the pump gear means 17 will be blocked whereby very high pressures are exerted on the outlet side of said pump gear means. It is apparent that whether the valve means are opened or closed a substantially greater fluid pressure is created in the meshing root area of the gears than the outlet pressure of the pump. Accordingly, it is desirable to provide some means for relieving this very high pressure at the meshing root area of the gears in order to prevent excessive loading on the gears which will tend to wear their bearings and thrust the gear teeth into forceful wearing engagement against the cavities defining the gear chambers.

Figure 3:
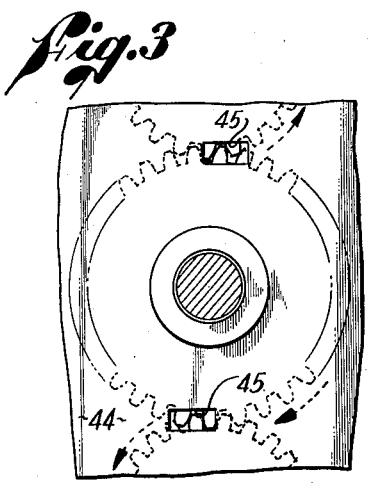
Figure 3 is a partial transverse sectional view on an enlarged scale taken on the line 3—3 of Figure 1 and particularly showing the gear pump pressure relief means incorporated in the gear pump chamber lining element.

In the present embodiment of my invention the pressure relief means are formed integrally with replaceable liner elements such as are shown in Figures 1 and 3. These liners are designated by the numeral 44 and as will be observed from Figures 1, 4 and 5 they comprise circular discs sandwiched between the plates 30 and 31 and between the plates 32 and 31. The liners 44 are preferably made of a rolled bronze material and receive the pump gears in a close running fit therebetween. The pressure relief means can be incorporated in one or both of the liners 44. Referring to Figure 3 it will be seen that the liner 44 is provided with generally rectangular slots there being one such slot positioned at the meshing area of the sun gear 40 with each of the pump gears 41. It will be observed that each slot 45 extends from the meshing area of the gears towards the inlet side of the pump. Accordingly, as the gears rotate, fluid entrapped between the meshing teeth therof is bled off towards the low pressure or inlet side of the pump thereby avoiding any tendency towards separation of the gears such as would drive the outer gear teeth into wearing contact with the gear chamber or overload the gear bearings.

Figure 4:
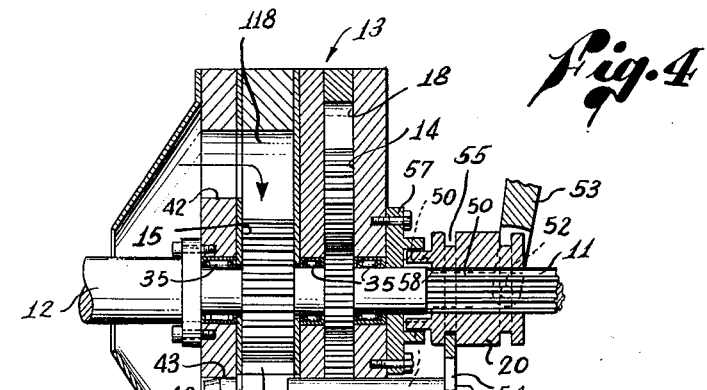
Figure 4 is a partial longitudinal sectional view of the apparatus shown in Figure 1 and illustrating the valve means in closed position.
Figure 5:
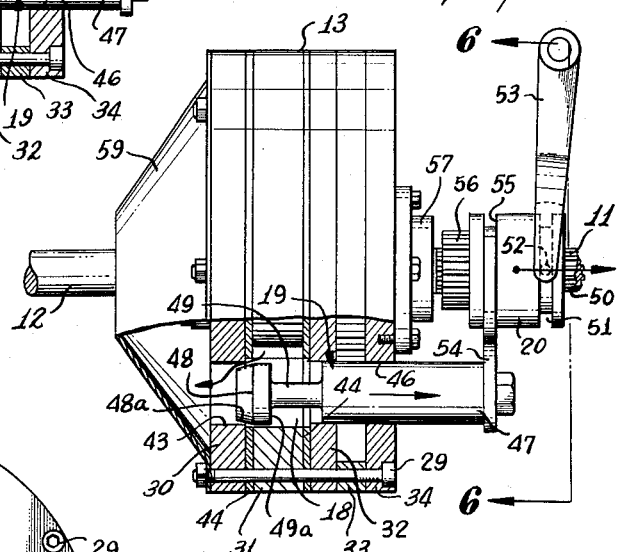
Figure 5 is an elevation of the apparatus shown in Figure 4 with parts cut away to show the valve means in partially open position.

The valve means 19 are best seen with reference to Figures 4 and 5. The aforementioned outlets 43 in the rear plate 30 comprise rearward continuations of bores 46 formed through the casing 13. The bores 46 are adapted to slidably receive therein a metering-out control valve 47 having a reduced diameter portion 49 which registers with the fluid passage 18 when the valve is closed. The rear end portion 48 of each valve member 47 is adapted to be received in an outlet 43 in a close sliding fit in the member shown in Figure 4 to effect closing of the valve. By tapering the end portions 48 in the manner shown and indicated by the numeral $48_a$ a finer degree of control is achieved. It will also be noted that passages 18 adjacent outlets 43 are greater in diameter than valves 47 so that the oil can pass out around the entire circumference of end portions 48.

As is indicated by the arrow in Figure 5 the valves 47 can be moved to full open position wherein end portions 48 are seated in plate 32. Closing of the valves is then resisted by the outlet pressures of the gear pump means 17 against their rear end faces. When valves 47 are closed this resistance is counterbalanced in part by virtue of the reduced diameter portions 49. Thus as is illustrated by the position of the valve 47 in Figure 5, gear pump outlet pressure is exerted on the annular shoulder $49_a$ defined by portion 49 and valve end 48 which tends to offset the pressures on the end face of the valve.

Simultaneous and coordinated opening and closing of the valves 47 is achieved by means of the control sleeve 20. As can be seen in Figure 1 the control sleeve 20 is splined to the drive shaft 11 as indicated at 50, in such a way that the sleeve 20 will rotate in unison with the drive shaft 11 but is freely axially slidable thereon. The sleeve 20 at its forward end has a circumferential groove 51 in which a pair of diametrically opposed pins 52 of a shiftable yoke 53 are received in a close running fit. The shifting yoke 53 at its upper end is suitably anchored to control means accessible from the exterior of housing 10 whereby axial movement of the control sleeve 20 can be accomplished by the operator.

Figure 6:
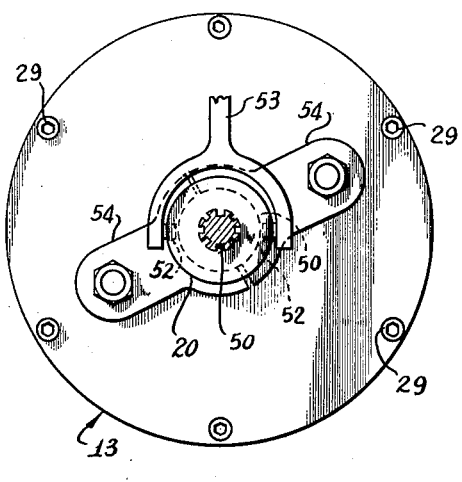
Figure 6 is an end view taken along the lines 6—6 of Figure 5.

Each valve 47 at the forward end thereof which protrudes from casing 13 rigidly mounts a bar 54 such as is shown in Figure 6. The bars 54 extend diametrically of the casing 13 towards one another and at their inner ends are of inwardly arcuate configuration. The rear end of the control sleeve 20 also has a circumferential groove 55 which is adapted to receive the inner ends of bar 54 in a close running fit. As is apparent with this arrangement actuation of the shifting yoke 53 will accomplish opening and closing of the valve means 19, whereby the rate of flow therethrough can be closely controlled.

After acceleration of a load on the driven shaft 12 to a constant speed it may be desirable to achieve a direct positive connection between the shafts 11 and 12. In order to provide for a one to one ratio between the drive shaft 11 and driven shaft 12 I have provided complementary means on the confronting faces of the casing 13 and control sleeve 20 which can be moved into engagement when said casing and the drive shaft 11 are moving in unison.

As is shown in Figures 4 and 5 the rear end of the control sleeve 20 is of reduced diameter and is provided with external gear means 56. Rigidly affixed to the forward face of the casing 13 is an annular plate 57 that has forwardly opening internal gear 58 formed therein which is adapted to mesh with the gear means 56. With this arrangement when the drive shaft 12 and therefore the casing 13 have been accelerated to the same rate of speed as the drive shaft 11, the external gear 56 can be moved into meshing engagement with the internal gear 58. After such engagement the drive or torque from the drive shaft 11 will be transmitted to casing 13 through the medium of the mating connection.

The bolt 29 which holds the plates of casing 13 in assembled relationship also provide a rigid mounting for a deflector 59 that is affixed to the rear face of said casing. Deflector 59 has the configuration of a truncated cone and has its reduced diameter end opening rearwardly into communication with oil contained in the housing 10. It will be understood that under operating conditions the housing 10 will be substantially full of oil. As the driven shaft 12 is accelerated it is desirable to insure that oil in housing 10 will be freely distributed to the inlets 42 that are formed in the rear plate 30. As the casing 13 accelerates appreciable turbulence will be set up in the oil present in housing 10 but despite such turbulence a constant flow of oil to inlets 42 is assured by the presence of the deflector 59. Upon acceleration of casing 13 any oil present at the entrance to the deflector will be centrifugally forced towards the inlets 42. As a result, despite the churning of oil in housing 10 the supply of oil to said inlets will not be choked.

In view of the foregoing description the method of operation of the device will readily be apparent. A suitable prime mover is connected to the drive shaft 11 and the load is imposed on the driven shaft 12. The control sleeve 20 will initially be in position wherein the outlets 43 will be open and valve means 19 offer no appreciable resistance to the passage of oil therethrough.

With the valve means 19 thus in open condition, upon the application of torque to the drive shaft 11 the driven shaft 12 and casing 13 will remain stationary. In this idling position oil will be freely pumped through the fluid passage means 18 and none of the torque of the drive shaft 11 will be transmitted to the driven shaft 12. Upon closing of the valve means 19 the rotating pump gears 41 will gradually be urged into planetary movement about the sun gear 40. As the flow of oil through the fluid passage means 18 is progressively choked, the speed of rotation of the sun gear 40 and pump gears 41 is progressively decreased by virtue of the choking action of the valve means 19. As a reaction to the closing of valve means 19 the pump gears 41 are urged into revolution about the axis of the drive shaft 11 until finally all rotation of the gears 40 and 41 has ceased while said gears revolve about the axis of the casing.

It should be noted in the illustrated embodiment that the ratios of the gears is such that the pump gear means 17 turn at a slower rate than drive shaft 11. With this arrangement the volume of fluid that is pumped is greatly reduced and the gear noise and wear also reduced.

While there has been shown herein what is considered to be the preferred embodiment of the present invention, it will be apparent that various modifications and changes may be made with respect to the foregoing description without departing from the spirit of the invention or the scope of the following claims.

I claim:

1. A transmission apparatus comprising: a stationary fluid housing; a drive shaft extending through one end wall of said housing; a driven shaft extending through the opposite end wall of said housing in coaxial alignment with said drive shaft; a cylindrical casing rigidly mounted on the inner end of said driven shaft that rotatably receives the inner end of said drive shaft through its axis, said casing being provided with a gear pump chamber and a drive gear chamber and having fluid passage means through said pump chamber; a sun gear idly rotatably mounted on the inner end of said drive shaft in said pump chamber; a plurality of pump gears journaled in said casing and symmetrically disposed around said sun gear in said pump chamber that drivingly engage said sun gear in said fluid passage means; a drive gear rigidly mounted on said drive shaft in said gear chamber; a plurality of transfer gears symmetrically arranged around said drive gear in said gear chamber that are drivingly rotatable in unison with said pump gears, said transfer gears being drivingly engaged by said drive gear to cause a fluid in said housing to be circulated through said passage means; and valve means to control the flow of fluid through said passage means that when open permit free circulation of fluid through said passage means in response to rotation of said pump gears and sun gear whereby said casing remains stationary and said pump gears and transfer gears are restrained against planetary movement, and that upon closing reactively urge said pump gears into movement whereby torque from said drive shaft is transmitted to said driven shaft through said casing.

2. A device as set forth in claim 1 in which said casing and drive shaft are provided with co-acting means that move into mating engagement when said valve means is fully closed to cause rotation in unison of said drive shaft and driven shaft, the portion of said co-acting means that is on said drive shaft being adapted to control opening and closing of said valve means.

3. In a transmission apparatus that includes coaxially aligned drive and driven shafts extending into a stationary fluid housing, the combination of; a cylindrical casing coaxially affixed to the inner end of said driven shaft that comprises a plurality of superimposed plates that are centrally bored to rotatably receive the inner end of said drive shaft therethrough, said plates being arranged to define in said casing a plurality of gear pump chambers at the end thereof adjacent to said driven shaft and a plurality of drive gear chambers at the other end of said casing in concentric alignment with said pump chambers, all of said chambers being disposed in counterbalancing arrangement relative to the axis of rotation of said casing and each of said pump chambers being provided with an inlet and outlet to a fluid in said housing; a pump gear in each of said pump chambers; a sun gear idly rotatably mounted on the inner end of said drive shaft in engagement with said pump gears to co-act with said pump gears to conduct fluid from said inlets to said outlets; a transfer gear in each of said drive gear chambers drivingly mounted on shafts in common with said pump gears for driving said pump gears in unison therewith; a drive gear rigidly affixed to said drive shaft in meshing engagement with said transfer gears; and a plurality of axially slidable valve members in said casing adapted for opening and closing said pump chamber outlets, said valve members when open permitting fluid from said housing to be pumped through said pump chambers whereby said casing and driven shaft remain stationary and said valve members upon closing reactively urging said pump gears into revolution about the axis of said casing whereby torque from said drive shaft is imparted through said casing to said driven shaft.

4. A device as set forth in claim 3 in which said casing is provided with pressure relief passages extending from the meshing areas of said sun gear and pump gears towards said pump chamber inlets that are adapted to relieve very high pressure fluid entrapped at said meshing areas.

5. In a transmission apparatus that includes coaxially aligned drive and driven shafts extending into a stationary fluid housing, the combination of: a cylindrical casing coaxially affixed to the inner end of said driven shaft that comprises a plurality of superimposed plates that are centrally bored to rotatably receive the inner end of said drive shaft therethrough, said plates being arranged to define in said casing a plurality of gear pump chambers at the end thereof adjacent to said driven shaft and a plurality of drive gear chambers at the other end of said casing in concentric alignment with said pump chambers, all of said chambers being disposed in counter-balancing arrangement relative to the axis of rotation of said casing and each of said pump chambers being provided with an inlet and outlet to a fluid in said housing; a pump gear in each of said pump chambers; a sun gear idly rotatably mounted on the inner end of said drive shaft in engagement with said pump gears to co-act with said pump gears to conduct fluid from said inlets to said outlets; a transfer gears in each of said drive gear chambers drivingly mounted on shafts in common with said pump gears for driving said pump gears in unison therewith; a drive gear rigidly affixed to said drive shaft in meshing engagement with said transfer gears; and a plurality of axially slidable valve members in said casing adapted for opening and closing said pump chamber outlets, said valve members when open permitting fluid from said housing to the pumped through said pump chambers whereby said casing and driven shaft remain stationary and said valve members upon closing reactively urging said pump gears into revolution about the axis of said casing whereby torque from said drive is imparted through said casing to said driven shaft, the opposite end walls of said pump chamber being covered by liners that receiver said sun gear and pump gears in a close running fit therebetween, at least one of said liners at the meshing areas of said sun gear and pump gears being provided with pressure relief slots communicating said meshing areas with the inlet sides of said pump gears.

6. In a transmission apparatus that includes coaxially aligned drive and driven shafts extending into a stationary fluid housing, the combination of: a cylindrical casing coaxially affixed to the inner end of said driven shaft that comprises a plurality of superimposed plates that are centrally bored to rotatably receive the inner end of said drive shaft therethrough, said plates being arranged to define in said casing a plurality of gear pump chambers at the end thereof adjacent to said driven shaft and a plurality of drive gear chambers at the other end of said casing in concentric alignment with said pump chambers, all of said chambers being disposed in counter-balancing arrangement relative to the axis of rotation of said casing and each of said pump chambers being provided with an inlet and outlet to a fluid in said housing; a pump gear in each of said pump chambers; a sun gear idly rotatably mounted on the inner end of said drive shaft in engagement with said pump gears to co-act with said pump gears to conduct fluid from said inlets to said outlets; a transfer gear in each of said drive gear chambers drivingly mounted on shafts in common with said pump gears for driving said pump gears in unison therewith; a drive gear rigidly affixed to said drive shaft in meshing engagement with said transfer gears; and a plurality of axially slidable valve members in said casing adapted for opening and closing said pump chamber outlets, said valve members when open permitting fluid from said housing to be pumped through said pump chambers whereby said casing and driven shaft remain stationary and said valve members upon closing reactively urging said pump gears into revolution about the axis of said casing whereby torque from said drive is imparted through said casing to said driven shaft, said drive shaft mounting an axially slidable control sleeve that rotates in unison therewith and said sleeve mounting means in a running fit thereon that are connected to said valve members whereby axial movement of said sleeve controls opening and closing movement of said valve members.

7. A device as set forth in claim 6 in which the confronting end faces of said sleeve and casing are provided with clutch means adapted for engagement when said valve members are fully closed to effect a one to one ratio between the speeds of said drive and driven shafts.

8. A transmission apparatus comprising: a stationary fluid housing; a drive shaft mounted through one end wall of said housing; a driven shaft mounted through an opposite end wall of said housing; a cylindrical casing concentrically rigidly affixed to the inner end of said driven shaft and formed with a plurality of fluid passages adapted to communicate with the interior of said housing; a gear pump mounted in said casing for each of said fluid passages; a generally cylindrical valve member for each of said passages axially slidably mounted in said casing in parallel alignment with the axis of said driven shaft and in concentric alignment with an outlet of one of said passages, said valve member having a reduced diameter portion adapted to register with said passage when said valve is in closed position to define a pair of annular shoulders on said valve member, the one of said shoulders adjacent the outlet-closing end of said valve member being thus adapted for exposure to gear pump output fluid pressures to counterbalance output fluid pressures on the outlet closing end face of said valve for facilitating axial opening and closing movement of said valve member; and gear means to drivingly connect said drive shaft to said gear pumps to idly circulate said fluid through said passages when said valve members are in open position, said valve members on closing restricting circulation of said fluid to reactively induce revolution of said gear pumps whereby said casing is rotated to drive said driven shaft.

9. A transmission apparatus comprising: a stationary fluid housing; a drive shaft extending through one end wall of said housing; a driven shaft extending through the opposite end wall of said housing in coaxial alignment with said drive shaft; a cylindrical casing rigidly mounted on the inner end of said driven shaft that rotatably receives the inner end of said drive shaft through its axis, said casing being provided with a gear pump chamber and a drive gear chamber and having a plurality of fluid passages adapted to circulate a fluid in said housing through said pump chamber; a sun gear idly rotatably mounted on the inner end of said drive shaft in said pump chamber adapted to intercept all of said fluid passages; a plurality of pump gears journaled in said casing and symmetrically disposed around said sun gear in said pump chamber and drivingly engaged with said sun gear in said fluid passages; a drive gear rigidly mounted on said drive shaft in said gear chamber; a plurality of transfer gears symmetrically arranged around said drive gear in said gear chamber that are drivingly rotatable in unison with said pump gears, said transfer gears being drivingly engaged by said drive gear to cause fluid to be pumped through said fluid passages; a generally cylindrical valve member for each of said passages axially slidably mounted in said casing in parallel alignment with the axis of said driven shaft and in concentric alignment with an outlet of one of said passages, said valve member having a reduced diameter portion adapted to register with said passage when said valve is in closed position to define a pair of annular shoulders on said valve member, the one of said shoulders adjacent the outlet-closing end of said valve member being thus adapted for exposure to gear pump output fluid pressures to counterbalance output fluid pressures on the outlet-closing end face of said valve for facilitating axial opening and closing movement of said valve member; and means to control positioning of said valve members in said casing.

10. In a transmission apparatus that includes coaxially aligned drive and driven shafts extending into a stationary fluid housing, the combination of; a cylindrical casing coaxially affixed to the inner end of said driven shaft that comprises a plurality of superimposed plates that are centrally bored to rotatably receive the inner end of said drive shaft therethrough, said plates being arranged to define in said casing a plurality of gear pump chambers at the axial end of said casing adjacent to said driven shaft and a plurality of drive gear chambers at the other end of said casing in concentric alignment with said pump chambers, all of said chambers being disposed in counterbalancing arrangement relative to the axis of rotation of said casing and each of said pump chambers being provided with an inlet and outlet to circulate a fluid in said housing through said pump chambers; a pump gear in each of said pump chambers; a sun gear idly rotatably mounted on the inner end of said drive shaft in engagement with said pump gears to co-act with said pump gears to conduct fluid from said inlets to said outlets; a transfer gear in each of said drive gear chambers drivingly mounted on shafts in common with said pump gears for driving said pump gears in unison therewith; a drive gear rigidly affixed to said drive shaft in meshing engagement with said transfer gears; and a generally cylindrical valve member for each of said gear pump chamber outlets that is axially slidably mounted in said casing in parallel alignment with the axis of said driven shaft and in concentric alignment with said outlet, said valve member having a reduced diameter portion adapted to register with a fluid passage through said gear pump chamber when said valve is in outlet-closing position to define a pair of annular shoulders on said valve member, the one of said shoulders adjacent the outlet-closing end of said valve member being thus adapted for exposure to gear pump output fluid pressures to counterbalance output fluid pressures on the outlet-closing end face of said valve member for facilitating axial opening and closing movement of said valve member.

References Cited in the file of this patent

UNITED STATES PATENTS

| | | |
|---|---|---|
| 979,272 | Feller | Dec. 20, 1910 |
| 1,307,488 | Durant | June 24, 1919 |
| 1,372,986 | Sundh | Mar. 29, 1921 |
| 1,645,565 | Wingquist | Oct. 18, 1927 |
| 2,191,340 | Corrigan | Feb. 20, 1940 |
| 2,209,949 | McCormack | Aug. 6, 1940 |
| 2,552,167 | Gleasman | May 8, 1951 |
| 2,644,561 | Dikeman | July 7, 1953 |
| 2,652,911 | Somers | Sept. 22, 1953 |
| 2,678,710 | Sterne | May 18, 1954 |
| 2,709,508 | Dikeman | May 31, 1955 |
| 2,727,607 | Colmerauer | Dec. 20, 1955 |
| 2,830,470 | Marsell | Apr. 15, 1958 |